S. T. WEBSTER.
REGENERATIVE MOTOR CONTROL SYSTEM.
APPLICATION FILED APR. 7, 1911.

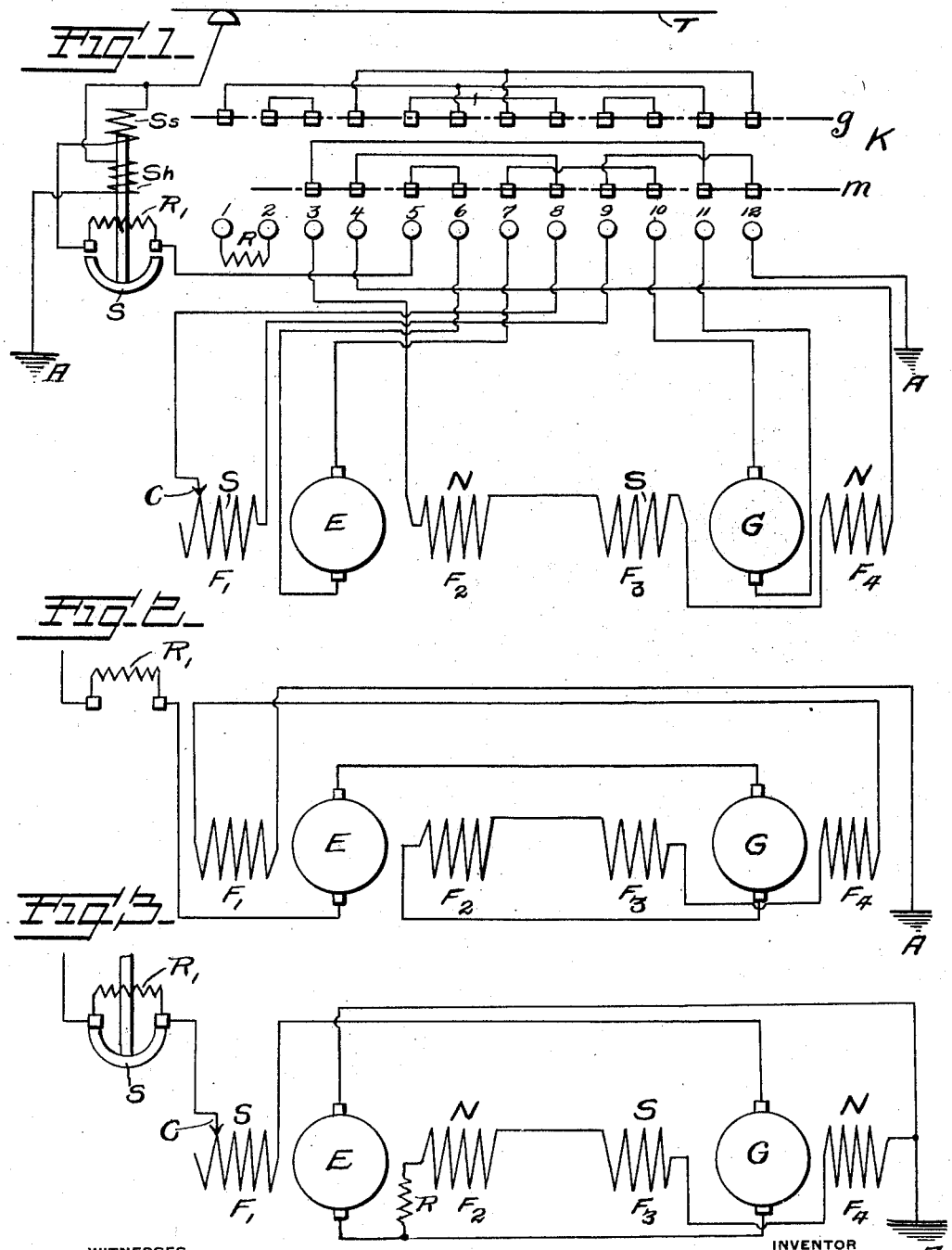

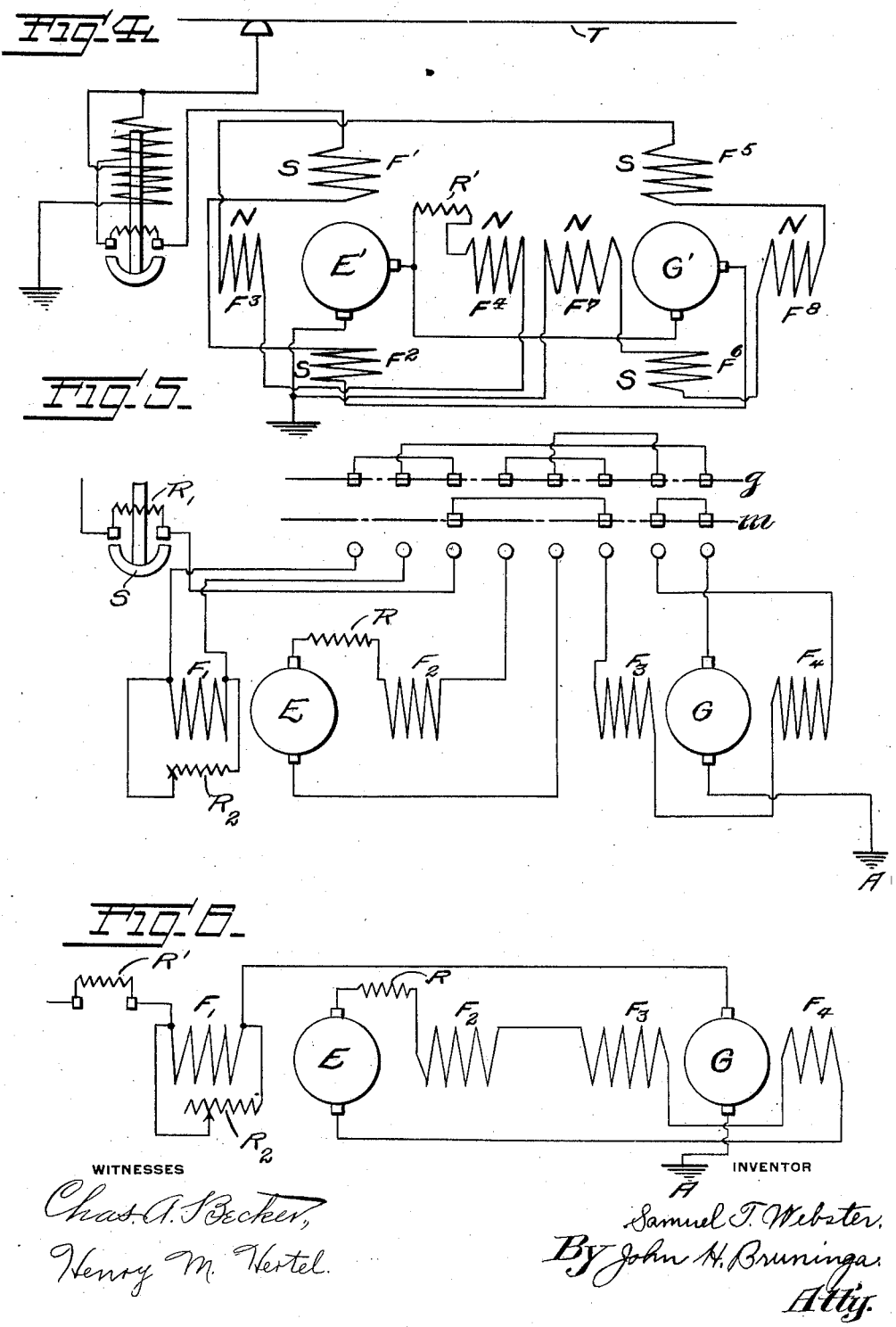

1,391,289.

Patented Sept. 20, 1921.

3 SHEETS—SHEET 3.

WITNESSES
Chas. A. Becker
Henry M. Hertel.

INVENTOR
Samuel T. Webster
By John H. Bruninga.
Atty.

UNITED STATES PATENT OFFICE.

SAMUEL T. WEBSTER, OF ST. LOUIS, MISSOURI, ASSIGNOR, BY MESNE ASSIGNMENTS, TO GENERAL ELECTRIC COMPANY, A CORPORATION OF NEW YORK.

REGENERATIVE MOTOR-CONTROL SYSTEM.

1,391,289.     Specification of Letters Patent.     Patented Sept. 20, 1921.

Application filed April 7, 1911. Serial No. 619,617.

*To all whom it may concern:*

Be it known that I, SAMUEL T. WEBSTER, a subject of the King of Great Britain, residing at St. Louis, in the State of Missouri, have invented certain new and useful Improvements in Regenerative Motor-Control Systems, of which the following is a specification.

This invention relates to regenerative motor control systems employing one or more motors in which the motor or motors is or are adapted to act as a generator or generators and return energy to the line.

In such systems as heretofore used, difficulty has, therefore, been experienced in regulating and controlling the value of the regenerated current or current returned to the line, thereby causing the motors to overheat or even burn out due to the excessive rise of regenerated current.

One of the objects of this invention, therefore, is to provide a system in which the value of the regenerated current will be automatically controlled and so that it cannot rise above a predetermined value, thereby rendering the system inherently self regulating.

Another object is to provide a system in which one or more electric motors of the simple series railway type can be used, so that the system is especially adapted to electric traction and motor vehicles for braking purposes.

Figure 7:
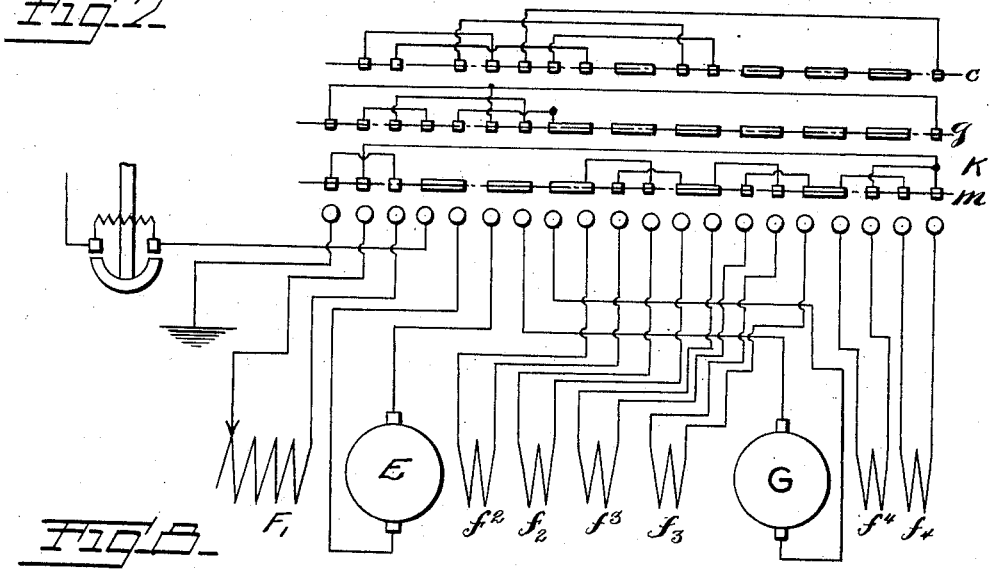
Figure 8:
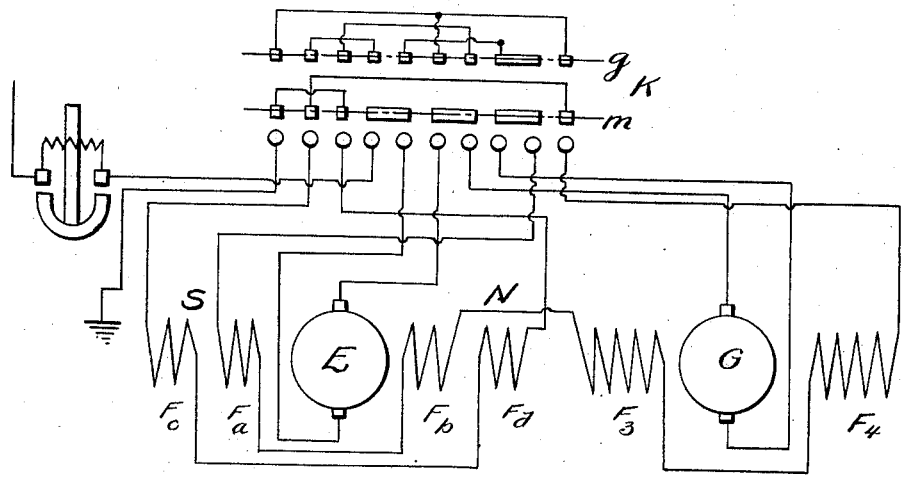
Figure 9:
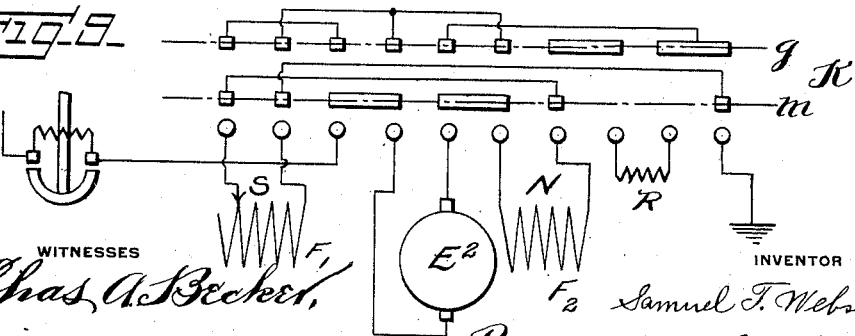

Further objects will appear from the detail description taken in connection with the accompanying drawings in which:

Figure 1 is a diagram showing one embodiment of this invention,

Fig. 2 is a diagram showing the connections of the motors when acting as motors, Fig. 3 is a diagram showing the connections when the motors are acting as generators to return current to the line, Fig. 4 is a diagram of a multi-polar system showing the connections of the motors when acting as generators to return current to the line, Fig. 5 is a diagram showing another embodiment of this invention, Fig. 6 is a diagram showing the connections of the system shown in Fig. 5 when regenerating, and Figs. 7, 8 and 9 are diagrams showing still other embodiments of this invention.

Generally stated, the systems which I have illustrated as embodiments of the invention, comprise one or more series motors having a portion of its field winding, (in case one motor is used) or a portion of the field winding of one of the motors, (in case a number of motors are used) connected in circuit with the line so that either the line or the regenerated current can flow through that portion, which portion may be termed the regulating portion. The portions of the field winding of this motor are arranged and connected to assist each other when a motor current traverses the circuit and the regulating portion, and therefore these portions will oppose each other when a regenerated current is delivered to the line. Since the value of the current flowing through the regulating portion will vary with the value of the regenerated current it will weaken the field and thus automatically control the value of the regenerated current. I would have it understood, however, that I do not regard my invention as limited to the specific arrangement thus generally described. The scope of the invention is indicated in the appended claims.

Referring to the accompanying drawings, and more particularly to Fig. 1, E and G designate dynamo electric machines, which in this particular embodiment, are of the series, direct current type provided with the usual armatures, and $F_1$ $F_2$ and $F_3$ $F_4$ designate the series field windings of these motors. These motors are arranged to be connected to the terminals T and A of a source of supply, shown in this case as a trolley and the ground of a railway line circuit so as to either operate as motors to drive a load or be driven thereby and operate as regenerative braking generators to brake the load. The machines will be hereinafter generally referred to as motors or as machines. A suitable controller K is arranged to connect these motors, and this controller is provided with suitable contacts 1 to 12 inclusive connected with the terminals of the line circuit, the motor field and armature windings, and with a resistance R. Suitable movable contacts are provided as usual to make the connections, $m$ being the motoring contacts, *i. e.*, the contacts which come into operation when the machines are to be operated as motors, and $g$ the regenerating contacts, *i. e.*, the contacts which come into operation when the machines are to be operated as generators. A steadying resistance $R_1$ is connected in the main circuit and is arranged to be short circuited by a switch S having a series coil $S_s$ and a shunt coil $S_h$.

The motors E and G are in this particular instance shown as of the two-pole series direct current type in which N and S poles are formed as shown. When the machines are to be used as motors, the field windings and armatures may be connected in series to the terminals of the line circuit by shifting the motor contacts $m$ to position. The connections when motoring are shown in Fig. 2; in this case the motors receive current from the line and operate as series motors in the usual way. When the vehicle is now to be braked, the regenerating contacts $g$ of the controller are moved into position, and the connections will be made as shown in Fig. 3. In this case the field coil $F_1$ of the machine E is connected in series with the armatures to the line, and the field coils $F_2$, $F_3$ and $F_4$ are connected across the armature of E in a local circuit. A portion of this local circuit is also a part of the braking circuit to the line. The connections are such that the line current will flow through the field coils $F_1$, $F_2$, $F_3$ and $F_4$ in the same direction as before so that the magnetization, due to the line current flowing through coils $F_1$ and $F_2$, will be in the same direction, i. e., $F_1$ and $F_2$ will assist each other. The machine E will thus be energized in the correct direction; thus making the system independent of residual magnetism for building up the voltage. The line current will set up a field in the machine E and cause an electromotive-force to be set up which is opposed to that of the line, and will also energize the field of machine G to set up an electromotive-force therein in the same direction as in machine E. The electromotive-force of machine E will set up a current in the field coils $F_2$, $F_3$ and $F_4$, and since the voltages of the machine E and of the line are applied to $F_2$, $F_3$ and $F_4$ in parallel, the current due to machine E will strengthen these fields. An electromotive-force will thus be set up in both the armatures of machines E and G, and due to the series connection between the machines, the voltages are added and are opposed to the line. At a certain critical speed of the coasting vehicle, and of the machines E and G geared thereto the sum of the voltages of machines E and G will equal that of the line and thereafter a regenerated current will be delivered to the line. It will be noted however that while a current from the line will flow through the field coil $F_1$ so that this field coil will assist $F_2$, when a regenerated current starts to flow, this regenerated current will flow through the coil $F_1$ in a reverse direction and its effect will therefore be to cause $F_1$ to oppose $F_2$. By reason of the fact that the field $F_2$ is supplied with current from its own armature and the field $F_1$ is included in the braking circuit through which the regenerated current flows, the machine E is thus a self-excited exciter, the excitation of which is governed by the value of the current in the braking circuit. This furnishes automatic means for regulating, controlling and limiting the value of the regenerated current, as follows:

When the combined voltages of the machines E and G rises to a predetermined point above the voltage of the line, and therefore as the current delivered to the line rises above a predetermined value, this current will in flowing through the field $F_1$ weaken the field of machine E. The weakening of the field of machine E will lower its voltage, which will decrease the current flowing through the coils $F_2$, $F_3$ and $F_4$, and therefore will not only still further weaken its own field, but will also weaken the field of G and lower its voltage. In fact the action is cumulative in a negative sense, in that the effect of an increase in the regenerated current is to weaken the field of machine E, which decreases its voltage, which being applied to its field winding $F_2$, still further decreases the field strength and therefore the voltage of machine E, which being applied to the field windings of machine G, reduces its voltage. In this way the voltages of machines E and G will be simultaneously and rapidly lowered. It will be seen that a small increase or decrease of regenerated current has a great cumulative effect upon the voltage, the current and upon the fields of machines E and G. In view of the multiplying effect or cumulative action that an increase of the regenerated current in $F_1$ has in lowering both the voltages of E and G, this system furnishes a means whereby an equilibrium will be quickly established, so that the regenerated current cannot rise above a predetermined value.

In order to regulate the value of the current so automatically controlled it is only necessary to regulate the ampere turns of $F_1$. This can be done in various ways, for instance by cutting in and out coils by a movable contact C as shown in Fig. 1, by providing an adjustable shunt $R_2$ as shown in Fig. 5, or in any other manner known to those skilled in the art. By regulating the ampere turns of $F_1$, the point where $F_1$ will affect the system will be varied and therefore the value of the regenerated current can be regulated.

It is desirable to cut out the steadying resistance $R_1$ when regenerating. For this purpose the switch S is arranged to short circuit $R_1$ when a regenerated current starts to flow. This is accomplished as follows:

The windings $S_s$ and $S_h$ of the controlling solenoid are so connected as to be in opposition when a motor current flows. As soon as a regenerated current starts to flow, this current will traverse $S_s$ in a reverse direction so that the action of $S_s$ and $S_h$ will now be in the same direction, causing the switch S to be closed and the resistance $R_1$ short circuited. A resistance R is also connected in circuit with the windings $F_2$, $F_3$ and $F_4$ when they are connected across the terminals of the armature of the machine E in order to limit the current. This resistance is however cut out when the machines are operating as simple series motors as will appear from Fig. 2.

This invention is equally applicable to multi-polar motors, thus Fig. 4 shows a diagram of connections of two four-pole series motors of the railway type. The controller connections have in this case been omitted and only the connections for regenerative operation have been shown. In this case the machine E' is provided with four field pole windings $F^1$, $F^2$, $F^3$ and $F^4$, and the machine G' with four windings $F^5$, $F^6$, $F^7$ and $F^8$. During regenerative operation F' and $F^2$ are connected in series with the armatures of machines E' and G' to the line, and the field windings $F^3$, $F^4$, $F^5$, $F^6$, $F^7$ and $F^8$ are connected in series with a resistance R' across the armature of the machine E'. The connections are similar to those shown in Fig. 3 and are such that F' and $F^2$ will assist $F^3$ and $F^4$ when a motor current flows in the circuit, and will oppose $F^3$ and $F^4$ when a regenerated current flows. The action of the system in its automatic control will therefore be similar to that shown in Fig. 1, and further description will therefore be unnecessary. It will be understood that F' and $F^2$ can be similary controlled as $F_1$ in Fig. 1.

In the system shown in Figs. 5 and 6, the machines E and G both operate as series motors when connected for motoring as shown in Fig. 5, at which time they are connected in series as in Fig. 2. When regenerating, however, the armature of the machine E is entirely disconnected from the line, and the machine E is then in fact a separate machine exciting the field of machine G. As shown in Figs. 5 and 6 when regenerating, the field $F_1$ is connected in series with the armature of machine G to the line while the field coils $F_2$, $F_3$ and $F_4$ are connected in series across the armature of machine E. The machine E is thus a self-excited exciter, the excitation of which is governed by the value of the regenerated current. It will be readily seen that the action of this system is, however, in general substantially the same as that of Figs. 1–3 inclusive, in this case however the machine G furnishes the entire regenerated current while the machine E at this time merely acts as an exciter with its armature connected in a local circuit with the fields $F_2$, $F_3$ and $F_4$. The portion G of the armatures of the machines is connected in a braking circuit with the line circuit, and the remainder E of the armatures is connected in said local circuit. The excitation of the machines is varied responsively to the regenerated current by the action of the exciter field winding $F_1$. The machine E can of course be used as a motor when motoring as in the system shown in Fig. 1.

In the systems shown in Figs. 1 to 6 inclusive it is necessary to insert a resistance in series with the field coils when these field coils are connected across the armature of machine E, in view of the fact that the field coils of a series motor are of very low resistance. In order to dispense with this resistance, the field coils $F^2$, $F^3$ and $F^4$ may consist of sections, the sections of a winding being connected in parallel when the machines are operating as motors, and all the sections being connected in series across the armature of E when the machines are operating as generators to return energy to the line. Such a system is shown in Fig. 7. The series coil $F_1$ is of the same construction as in the other figures, but the other field winding of the machine E is composed of sections $f^2$, $f_2$ and the field windings of the machine G are composed of sections $f^3$, $f_3$ and $f^4$, $f_4$. When the machines are operating as motors, the sections of the windings are connected in parallel, and the sets of sections are connected in series with the armatures as in Figs. 1 and 2. When however the machines are connected for regeneration, then the coil sections $f^2$, $f_2$, $f^3$, $f_3$, $f^4$, and $f_4$ are all connected in series across the armature of the machine E. These connections can readily be traced out from Fig. 7. By means of this arrangement the resistance R can be dispensed with, in view of the fact that the resistance of the circuit connected across the armature of E has been increased (four times in this case) by the series connection of the sections. It will be understood of course that the windings may be divided into any number of sections.

In the systems shown in Figs. 1 to 7 inclusive, the controlling field winding $F_1$ forms one of the pole windings of the motor, and in Fig. 4 the winding is on poles of the same polarity. It is possible however to arrange the windings so that the controlling winding will be placed on all poles or on opposite poles. Such a system is shown in Fig. 8 in which E and G are two-pole machines. The machine G is of the same construction as in Fig. 1. The poles of the machine E are provided with two windings, namely a winding $F_a$, $F_b$ and a winding $F_c$, $F_d$, each winding having half the number of turns as the normal series winding. When the machines are operating as motors, all the windings on E are connected in series so that $F_a$, $F_b$ and $F_c$, $F_d$ will assist each other, forming in fact a simple series winding. When the machines are connected for regenerative operation, the winding $F_a$, $F_b$ is connected in series with $F_3$, $F_4$ across the armature of E, while the winding $F_c$, $F_d$ is connected in series with the armatures to the line as in Figs. 1 and 3. The connections are made so that the winding $F_c$, $F_d$ will assist $F_a$, $F_b$ when a motor current flows through the machines, and therefore winding $F_c$, $F_d$ will oppose $F_a$, $F_b$ when a regenerated current is delivered to the line. The operation is therefore similar to the system shown in Fig. 1.

It is possible to operate this system with one motor as with a plurality of motors. Such a system is shown in Fig. 9. When the machine $E^2$ is operating as a motor, the series field windings $F_1$ and $F_2$ are connected in series with the armature to the line as usual. When however the machine is operating as a generator to return energy to the line, then the winding $F_2$ is connected in series with the resistance R across the armature, while $F_1$ is connected in series with the armature to the line. The connections are such that $F_1$ and $F_2$ will assist each other when a motor current traverses the circuit, while $F_1$ will oppose $F_2$ when a regenerated current is fed back to the line. The operation is therefore, in general, similar to the system shown in Fig. 1, except that this embodiment requires hand regulation, does not keep the regenerated current within a predetermined limit, and is not as stable as the systems shown in the other figures. It will be understood of course that the ampere turns of $F_2$ will preponderate at all times.

It will be readily seen that the system may be used in connection with means for short circuiting the armatures, i. e., after the speed has dropped below a certain limit the armatures may be disconnected from the line and short circuited across the field coils so as to brake the motors and the car to stand still. Thus in Fig. 7 a row of short circuit contacts c are provided which are arranged to connect the field windings of each motor in series with its armature.

It will therefore be seen that this invention provides a system in which energy can be returned to the line, as in traction work for braking the car electrically when going down grade or when decelerating. The value of the current will be automatically controlled and limited so that it cannot rise above a dangerous value, and the value of the current so automatically limited can be adjusted as desired. The controlling action is especially rapid and effective where a number of machines are used and in which one machine controls the other in view of the multiplying or negative cumulative effect of an increase of the delivered regenerated current upon the voltage of both machines. This causes a point of stability to be quickly reached. With this system it is not necessary to use a resistance which is gradually cut out as the speed drops, or gradually cut in as the speed rises, as the control is entirely automatic, since a fixed limit is established for the regenerated current beyond which it cannot rise. The system is, therefore, absolutely "fool proof" and the motorman or engineer is not required to carefully watch a meter, and cut in resistance when the value of the regenerated current rises above a predetermined value. Furthermore, the value of the regenerated current is not only limited, but maintained, i. e., the connections are not broken when a certain value is passed. The motors when operating as generators are as inherently self regulating as two simple series motors.

It is possible to use this system with ordinary simple series motors of the railway type so that the advantages of the series motor, as distinguished from a shunt or compound motor, can be retained, and in fact present traction systems can easily be altered by the addition of a suitable controller, in view of the fact that the series windings themselves may remain unaltered. The system does not interfere with the ordinary multiple unit or series parallel control of motors and may readily be used in connection therewith.

Having thus described the invention what is claimed is:

1. The method of braking a series motor which comprises connecting a portion of its field winding in shunt to its armature and another portion in series with the armature to the line in order to return energy to the line when the motor acts as a generator.

2. The method of braking a series motor which comprises connecting a portion of its field winding in shunt to its armature and another portion in series with the armature to the line in such relations as to cause said portions to oppose each other in order to return energy to the line when the motor acts as a generator.

3. The method of braking a series motor which comprises connecting a portion of its field winding in shunt to its armature and another portion in series with the armature to the line in such relations as to cause said portions to assist or oppose each other when a motor or a generator current traverses the circuit respectively.

4. The method of operating a plurality of motors which comprises connecting the motor armatures in series to the line, connecting the field winding of one motor across the terminals of the other motor, and connecting a portion of the field winding of the second motor in series with said armatures.

5. The method of operating a plurality of motors which comprises connecting the motor armatures in series to the line, connecting the field winding of one motor across the terminals of the other motor, and weakening the field of the second motor when the current passing through said armatures rises above a predetermined value.

6. The method of operating a plurality of motors which comprises connecting the motor armatures in series to the line, connecting the field winding of one motor and a portion of the field winding of the other motor across the terminals of the second motor, and connecting another portion of the field winding of the second motor in series with the armatures.

7. The method of operating a plurality of motors which comprises connecting the motor armatures in series to the line, connecting the field winding of one motor across the terminals of the other motor, and connecting portions of the field winding of the second motor to a source of current so that they will assist and oppose each other at different times.

8. In a regenerative control system, the combination with a source of current, of a plurality of motors having field windings and armatures and adapted to act as generators and return energy to said source, means for connecting the armatures in series to said source, means for connecting the field winding of one motor and a portion of the field winding of the other motor across the terminals of the second motor, and means for connecting the other portion of the field winding of the second motor in series with the armatures.

9. In a regenerative control system, the combination with a source of current, of a plurality of motors adapted to act as generators and return energy to said source, a resistance in the motor circuit, and means for automatically cutting out said resistance when a regenerated current flows to said source.

10. In a regenerative control system, the combination with a source of current, of a plurality of motors having field windings and armatures and adapted to act as generators and return energy to said source, means for connecting the armatures in series to said source, and means adapted to cause one motor to control the voltage of both motors.

11. The method of braking a series motor which comprises connecting a portion of its field winding in shunt to its armature and another portion in series with the armature to the line in order to return energy to the line when the motor acts as a generator, and then disconnecting the motor from the line and short circuiting the motor.

12. The method of operating a plurality of motors which comprises connecting the motor armatures in series to the line, connecting the field winding of one motor and a portion of the field winding of the other motor across the terminals of the second motor, connecting another portion of the field winding of the second motor in series with the armatures, and then disconnecting the motors from the line and short circuiting the same.

13. In a regenerative motor control system, the combination with a source of current, of a motor having armature and field windings and adapted to act as a generator and return energy to said source, and means comprising controlling elements coacting to produce a cumulative regulating action, adapted for automatically controlling the current delivered by said motor when acting as a generator to compensate for changes in its speed.

14. In a regenerative control system, the combination with a line circuit, of a series motor having an armature and field windings and adapted to act as a braking generator, a source of current, means for connecting said motor with said line circuit to receive current therefrom and operate as a motor, and means for connecting the armature of said motor to said line circuit and the field windings thereof to said source of current together with means coöperating with said source of current adapted to cause the motor to act as a generator and return current to said line circuit, and adapted to automatically control the current traversing said field windings so as to vary in accordance with the regenerated current.

15. In a regenerative control system, the combination with a line circuit, of a series motor having an armature and field windings and adapted to act as a braking generator, a source of current, means for connecting said motor with said line circuit to receive current therefrom and operate as a motor, and means for connecting the armature of said motor to said line circuit and the field windings thereof to said source of current, together with means coöperating with said source of current adapted to cause the motor to act as a generator and return current to said line circuit, and adapted to automatically control the field strength of said motor when acting as a generator so as to vary inversely as the value of the regenerated current.

16. In a regenerative control system, the combination with a line circuit, of a series motor having an armature and field windings and adapted to act as a braking generator, a source of current, means for connecting said motor with said line circuit to receive current therefrom and operate as a motor, and means for connecting the armature of said motor to said line circuit and the field windings thereof to said source of current, together with means coöperating with said source of current adapted to cause the motor to act as a generator and return current to said line circuit, and adapted to decrease the field strength of said motor when the regenerated current rises above a predetermined value.

17. In a regenerative control system, the combination with a line circuit, of a series motor having an armature and field windings and adapted to act as a braking generator, a source of current, means for connecting said motor with said line circuit to receive current therefrom and operate as a motor, and means for connecting the armature of said motor to said line circuit and the field windings thereof to said source of current, together with means coöperating with said source of current adapted to cause the motor to act as a generator and return current to said line circuit, and adapted to cause the current traversing said field windings to decrease when the regenerated current rises above a predetermined value.

18. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field winding thereof to another of said motors, adapted to cause said first motor to act as a braking generator and return current to said line circuit, and means responsive to the current in the armature circuit of the first motor coöperating with said second motor, adapted to automatically control the current delivered by said first motor when acting as a generator.

19. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field winding thereof of another of said motors, adapted to cause said first motor to act as a braking generator and return current to said line circuit, and means coöperating with said second motor, adapted to cause the current traversing the field winding of said first motor to vary inversely as the regenerated current.

20. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field winding thereof to another of said motors, adapted to cause said first motor to act as a braking generator and return current to said line circuit, and means for varying the excitation of the second motor responsively to the regenerated current.

21. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field winding thereof to another of said motors, adapted to cause said first motor to act as a braking generator and return current to said line circuit, and means for connecting the field windings of said second motor in differential relation with one of the windings connected to be traversed by the regenerated current.

22. In a regenerative control system, the combination with a line circuit, of a plurality of series wound dynamo electric machines having armatures and field windings and adapted to act as motors or as generators, means for connecting said machines with said line circuit to receive current therefrom and act as motors, means for connecting the armatures of said machines to said line circuit and for connecting the field winding of one of said machines and a field winding of another of said machines to said second machine, adapted to cause said machines to act as braking generators and return current to said line circuit, and means responsive to the current in the armature circuit of the first machine coöperating with said second machine, adapted to automatically control the current delivered by said first machine when acting as a generator.

23. In a regenerative control system, the combination with a line circuit, of a plurality of series motors having armatures and field windings and adapted to act as generators, means for connecting said motors with said line circuit to receive current therefrom and act as motors, means for connecting the armatures of said motors to said line circuit and for connecting the field winding of one of said motors and a field winding of another of said motors to said second motor, adapted to cause said motors to act as braking generators and return current to said line circuit, and means for connecting a field winding of said second motor so as to be traversed by the regenerated current.

24. In a regenerative control system, the combination with a line circuit, of a plurality of series motors having armatures and field windings and adapted to act as generators, means for connecting said motors with said line circuit to receive current therefrom and act as motors, means for connecting the armatures of said motors to said line circuit, means for connecting the field windings of one of said motors to the armature of the other motor, and means for connecting the field windings of said second motor, adapted to cause said motors to act as braking generators and return an automatically controlled current to said line circuit.

25. In a regenerative control system, the combination with a line circuit, of a plurality of series motors having armatures and field windings and adapted to act as generators, means for connecting said motors with said line circuit to receive current therefrom and act as motors, means for connecting the armatures of said motors to said line circuit, means for connecting the field windings of one of said motors to the armature of the other motor, and means for connecting the field windings of said second motor to set up a field varying inversely as the regenerated current, adapted to cause said motors to act as braking generators and return an automatically controlled current to said line circuit.

26. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field winding thereof to another of said motors, adapted to cause said first motor to act as a braking generator and return current to said line circuit, and means coöperating with said second motor, adapted to decrease the voltage applied to the field windings of said first motor in accordance with the increase of the current traversing its armature.

27. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field winding thereof to another of said motors, adapted to cause said first motor to act as a braking generator and return current to said line circuit, and means coöperating with said second motor, and controlled by the regenerated current, adapted to decrease the voltage applied to the field windings of said first motor, in accordance with the increase of its speed.

28. In a regenerative control system, the combination with a line circuit, of a plurality of series motors having armatures and field windings and adapted to act as generators, means for connecting said motors with said line circuit to receive current therefrom and operate as motors, means for connecting the armatures of one of said motors to said line circuit and the field winding thereof to another of said motors, adapted to cause said first motor to act as a braking generator and return current to said line circuit, and means coöperating with said second motor adapted to limit the value of said generated current.

29. In a regenerative control system, the combination with a plurality of series wound direct current dynamo electric machines adapted to either drive a load or be driven by the load and operate as generators for regenerative braking, of a controller having means for connecting a portion of the armatures of said machines in a braking circuit and the remainder of the armatures of said machines as an exciter in a local circuit with the field windings of the said portion of the machines and for connecting the field windings of the said exciter to be energized to supply an excitation for the exciter which varies responsively to the current in the said braking circuit.

30. In a regenerative control system, the combination with a plurality of series wound direct current dynamo electric machines adapted to either operate as motors to drive a load or be driven by the load and operate as generators for regenerative braking, of means for connecting a portion of the armatures of said machines in a braking circuit and the remainder of the armatures thereof in a local circuit with the field windings associated with the said portion of the armatures to operate as an exciter for the machines, and means whereby the current in the said local circuit is automatically varied responsively to the current in the said braking circuit.

31. The combination in a system of power transmission and regenerative braking of a plurality of series wound direct current dynamo electric machines adapted to either operate as motors to drive a load or be driven by the load and operate as generators for electric braking, of means for connecting a portion of the armatures of the said machines in a braking circuit, and connections whereby during braking the remainder of the machines operates as a self-exciter for the said machines and the excitation of the said exciter is automatically varied responsively to the current in the said braking circuit.

32. In a regenerative control system, the combination with a plurality of series wound dynamo electric machines adapted to either operate as motors to drive a load or be driven by the load and operate as generators for regenerative braking, means for connecting a portion of the armatures of said machines in a braking circuit and the remainder of the armatures thereof in a local circuit with the corresponding field windings of the said portion to operate as an exciter for the said portion, means for automatically varying the excitation of said machines responsively to the current in the said braking circuit to thereby automatically regulate the value of the current in the braking circuit, and means for varying at will the value of the current in the said braking circuit to be thus automatically regulated.

33. In a regenerative control system, the combination with a plurality of series wound dynamo electric machines adapted to either operate as motors to drive a load or be driven by the load and operate as generators for regenerative braking, means for connecting a portion of the armatures of said machines in a braking circuit and the remainder of the armatures thereof in a local circuit with the corresponding field windings of said portion to operate as an exciter for the said portion, means for automatically varying the excitation of said machines responsively to the current in the said braking circuit to thereby automatically regulate the value of the current in the braking circuit, and means for varying at will the excitation of the said exciter to thereby vary the value of the current in the braking circuit to be thus automatically regulated.

In testimony whereof I affix my signature in presence of two witnesses.

SAMUEL T. WEBSTER.

Witnesses:
 WM. H. J. HARRIS,
 J. H. BRUNINGA.

It is hereby certified that in Letters Patent No. 1,391,289, granted September 20, 1921, upon the application of Samuel T. Webster, of St. Louis, Missouri, for an improvement in "Regenerative Motor-Control Systems," an error appears in the printed specification requiring correction as follows: Page 7, line 128, claim 31, for the compound word "self-exciter" read *self-excited exciter;* and that the said Letters Patent should be read with this correction therein that the same may conform to the record of the case in the Patent Office.

Signed and sealed this 15th day of November, A. D., 1921.

[SEAL.] KARL FENNING,

*Acting Commissioner of Patents.*